United States Patent [19]
Shimizu

[11] Patent Number: 5,687,811
[45] Date of Patent: Nov. 18, 1997

[54] VARIABLE GEAR RATIO STEERING DEVICE

[75] Inventor: Yasuo Shimizu, Saitama-ken, Japan

[73] Assignee: Honda Giken Kogyo Kabushiki Kaisha, Tokyo, Japan

[21] Appl. No.: 486,303

[22] Filed: Jun. 7, 1995

[30] Foreign Application Priority Data

Jun. 20, 1994 [JP] Japan .................. 6-160682

[51] Int. Cl.$^6$ .................................................. B62D 3/00
[52] U.S. Cl. .......................... 180/447; 180/428; 74/422; 74/498
[58] Field of Search ........................ 180/252, 253, 180/400, 421, 426, 427, 428, 447; 280/771; 74/422, 498

[56] References Cited

U.S. PATENT DOCUMENTS

| | | | |
|---|---|---|---|
| 2,973,658 | 3/1961 | Bishop | 180/428 |
| 3,741,074 | 6/1973 | Oxley et al. | 180/427 X |
| 3,753,378 | 8/1973 | Bishop | 74/422 |
| 4,133,221 | 1/1979 | Clary | 74/498 |
| 4,903,791 | 2/1990 | Cameron et al. | 180/252 |
| 5,469,929 | 11/1995 | Dadak et al. | 180/429 |

Primary Examiner—Victor E. Johnson
Attorney, Agent, or Firm—Skjerven, Morrill, MacPherson, Franklin & Friel LLP; Alan H. MacPherson; Thomas S. MacDonald

[57] ABSTRACT

In a variable gear ratio steering device comprising a rack and pinion gear mechanism, the rack of the rack and pinion gear mechanism is provided with tooth pitch distribution for producing a variable rack gain property in relation to a steering input which includes, in each rotational sense, a low fixed rack gain region near a neutral position, a high fixed rack gain region in a large steering input region, and a progressively increasing rack gain region connected to the low fixed rack gain region via a first point of inflection and to the high fixed rack gain region via a second point of inflection. Because the point of inflection or the point of transition from a fixed low rack gain region to a region of a progressively increasing rack gain falls inside the region of the play of the steering mechanism, the vehicle operator would not be affected by the presence of the point of inflection because as soon as the steering wheel is turned beyond the play or the dead zone near the neutral position of the steering wheel the point of inflection has already been passed. Another point of inflection or the point of transition between the region of the progressively increasing rack gain and the fixed high rack gain region also would not affect the vehicle operator because it is located well outside the range of normal operation in a medium to high speed range, and it will not be noticeable in a low speed range even when the steering angle passes this point.

4 Claims, 5 Drawing Sheets

VARIABLE GEAR RATIO STEERING DEVICE

TECHNICAL FIELD

The present invention relates to a variable gear ratio steering device which can change the steering angle ratio or the ratio of the steering angle of the road wheels to the steering wheel angle in a nonlinear fashion, and in particular to a variable gear ratio steering device which can progressively increase the steering angle ratio with an increase in the steering input.

BACKGROUND OF THE INVENTION

FIG. 2 shows a conventional rack and pinion steering mechanism for motor vehicles which is provided with an electric motor for reducing the effort required for turning the steering wheel. In this electric power steering device, the steering wheel 1 is integrally attached to a steering shaft 2, and a lower end of the steering shaft 2 is connected to a pinion 4 via a connecting shaft 3 including a pair of universal joints 3a and 3b. The pinion 4 meshes with a rack 5 extending laterally of the vehicle body, and the rack 5 is connected at its two ends to a pair of front wheels 7 via tie rods 6 and knuckle arms, respectively. Thus, according to this steering device, the rotational movement of the steering wheel 1 is converted into the lateral linear movement of the rack 5 which is in turn converted into the steering movement of the front wheels 7.

The electric motor 8 for providing an assisting torque is provided with a hollow rotor through which the rack 5 is passed, and actuates a ball screw mechanism 9 extending along the rack 5 which converts the rotational movement of the output shaft of the electric motor 8 into a linear movement of the rack 5. More specifically, the rotor of the electric motor 8 is integrally provided with a helical drive gear 8a which meshes with a helical driven gear 9b integrally attached to an axial end of a screw shaft 9a of the ball screw mechanism 9. The nut of the ball screw mechanism is connected to the rack 5.

Inside the steering gear box is provided a steering torque detector 10 including a torsion bar for detecting the manual steering torque applied to the pinion 4, and the output signal from the steering torque detector 10 is supplied to a control unit 11 which controls the electric motor 8 according to this output signal.

This conventional steering device consists of a variable gear ratio steering device whose effective gear ratio changes according to the magnitude of the steering input. More specifically, in a normal range of operation corresponding to a medium to high vehicle speed range (involving, for instance no more than 150 degrees of rotation of the steering shaft 2 on either side of a neutral position), the displacement of the rack 5 is relatively small for a given steering input, or the rack gain is relatively low. On the other hand, in a low vehicle speed range where a large steering input is often necessary, the displacement of the rack for a given steering input is increased, and the rack gain is increased.

Such a conventional variable gear ratio steering device can be achieved, for instance, by using a rack and pinion mechanism in which the rack teeth are formed as given in FIG. 3. In this rack 5, the pitch of the rack teeth is progressively increased as the distance from the neutral position is increased. In FIG. 4, the pinion 4 in the neutral position is indicated by imaginary lines while the pinion 4 placed away from the neutral position is indicated by solid lines.

The rack gain of a rack and pinion mechanism is defined as a displacement of the rack for each turn of the pinion, and the rack gain of a typical rack and pinion mechanism is given in FIG. 5. The straight horizontal imaginary line indicates a fixed rack gain $R_0$, and the solid curve indicates a typical rack gain of a variable gear ratio steering device. According to this variable gear ratio steering device, when the steering input is small or less than $\theta_1$ in the absolute value, the gear ratio is constant at a level ($R_1$) which is substantially lower than the rack gain $R_0$ of the fixed gear ratio steering device. When the absolute value of the steering input is increased beyond $\theta_1$, the rack gain progressively increases (in a substantially proportional relationship to the magnitude of the steering input according to this example). When the absolute value of the steering input has increased beyond another threshold level $\theta_2$, the rack gain is again fixed at a constant level $R_2$ which is however substantially greater than the rack gain again R0 of the fixed gear ratio steering device.

Thus, according to this conventional variable gear ratio steering device, the point of inflection at which the rack gain moves on from a region of a fixed level $R_1$ to a region of a progressive increase occurs at the steering angle of $\theta_1$ which is typically ±40 degrees away from the neutral position which falls into the range of normal operation (±150 degrees from the neutral position). This scheme is based on the consideration to achieve a uniform handling of the steering device in the region near the neutral position, and smoothly connect this region of a small rack gain to the region of a large rack gain. Thus, according to this conventional device, it is possible to achieve a low rack gain in the region of small steering input and a high gain in the region of large steering input, or, in other words, a stable handling in a medium to high speed range, and a favorable maneuverability in a low speed range can be achieved at the same time.

Therefore, when a relative large steering maneuver is executed at a medium to high speed range, the steering device may be steered beyond the point of inflection. In this case, as the steering angle passes the point of inflection, the vehicle operator inevitably experiences a sudden change in the steering reaction of the steering device, and the yaw movement of the vehicle body, and may not feel very comfortable. To eliminate such a problem, it may be conceivable to abolish the region of a fixed rack gain near the neutral position and place the point of inflection right on the neutral position. However, in reality, achieving such an arrangement in a rack and pinion steering device has been considered, at least, impractical because of various restrictions imposed on the fabrication of the gear mechanism, and the need for some amount of tolerance in the dimensional precision of the gear members. In particular, an offset in the neutral position of the steering device is highly perceptible to the vehicle operator, and a region of a fixed rack gain of a certain width has been therefore considered necessary to make any such offset acceptable to the vehicle operator.

Furthermore, when such a conventional variable gear ratio steering device is used on a FF (front engine front drive, i.e., a front wheel drive,) vehicle which tends to have an understeer tendency, the vehicle operator needs to turn the steering wheel by a larger angle than anticipated and may experience a discontinuous impression so that the vehicle operator may feel somewhat uncomfortable. By taking an example of a FF vehicle, the steering properties of the conventional variable gear ratio steering device are compared with those of the conventional fixed gear ratio steering device as shown in FIG. 6 in which $\theta_0$ denotes an initial steering angle when the vehicle is making a turn of a constant radius and θ denotes an actual steering angle that is actually required to make the turn. It means that, in the case of the conventional variable gear ratio steering device, the steering angle necessary for turning a curve of a given radius increases as the vehicle speed is increased, and the lateral acceleration is increased. In other words, the conventional steering device produces an excessive understeer tendency which is not desirable for the comfort of the vehicle operator.

BRIEF SUMMARY OF THE INVENTION

In view of such problems of the prior art, a primary object of the present invention is to provide a variable gear ratio steering device which can provide a uniform steering property regardless of the vehicle speed while maintaining the advantages of a variable gear ratio steering device.

A second object of the present invention is to provide a variable gear ratio steering device which can provide uniform steering property regardless of the vehicle speed without complicating the fabrication process.

A third object of the present invention is to provide a variable gear ratio steering device which can control the understeer tendency of the vehicle.

According to the present invention, such objects can be accomplished by providing a variable gear ratio steering device, comprising: a pinion functionally coupled to a steering wheel; and a rack meshing with the pinion; the rack having a tooth pitch distribution for producing a variable rack gain property in relation to a steering input which includes, in each rotational sense, a low fixed rack gain region near a neutral position, a high fixed rack gain region in a large steering input region, and a progressively increasing rack gain region connected to the low fixed rack gain region via a first point of inflection and to the high fixed rack gain region via a second point of inflection; the first point of inflection being located within a first angle at the neutral position of an amount within a play in an overall steering system of a vehicle on which the steering device is installed. For instance, the first point of inflection may be located within ten degrees of the rotational angle of the steering wheel from the neutral position. For the convenience of fabrication, the first point of inflection may be located five degrees away from the neutral position in terms of the steering input in view of the difficulty involved in fabricating the variable gear ratio rack and pinion gear mechanism.

Thus, the inconvenience of passing the first point of inflection during a sensitive maneuver in a medium to high speed range can be avoided. Typically, the present invention is applied to a power steering device which includes torsion bar means for detecting a steering torque applied to the steering wheel and actuating an actuator for the power steering device according to a magnitude of a twisting angle of the torsion bar means, and the first point of inflection is located within a certain angular displacement of the steering wheel away from the neutral position which is smaller than a maximum twisting angle of the torsion bar means.

The second point of inflection is located outside a range of normal operation in a medium to high speed range, and would not interfere with the operation of the vehicle in a medium to high speed range. The second point of inflection will be encountered in a low speed range where large steering angles often occur but the handling of the vehicle is so stable and insensitive that the vehicle operator would not experience any inconvenience.

The play mentioned above may include any combination of a play in a gear mechanism of the steering device, a play in a mechanical linkage in a torque transmitting path of the overall steering system, an elastic deformation of parts involved in a torque transmitting path of the overall steering system, and a twisting deformation of vehicle tires.

In a front engine front drive vehicle which often has an understeer tendency, the present invention is particularly useful because the virtual absence of any fixed low rack gain region near the neutral position prevents an insufficiency in the steering angle of the tires when the vehicle makes a turn in a medium to high speed range.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
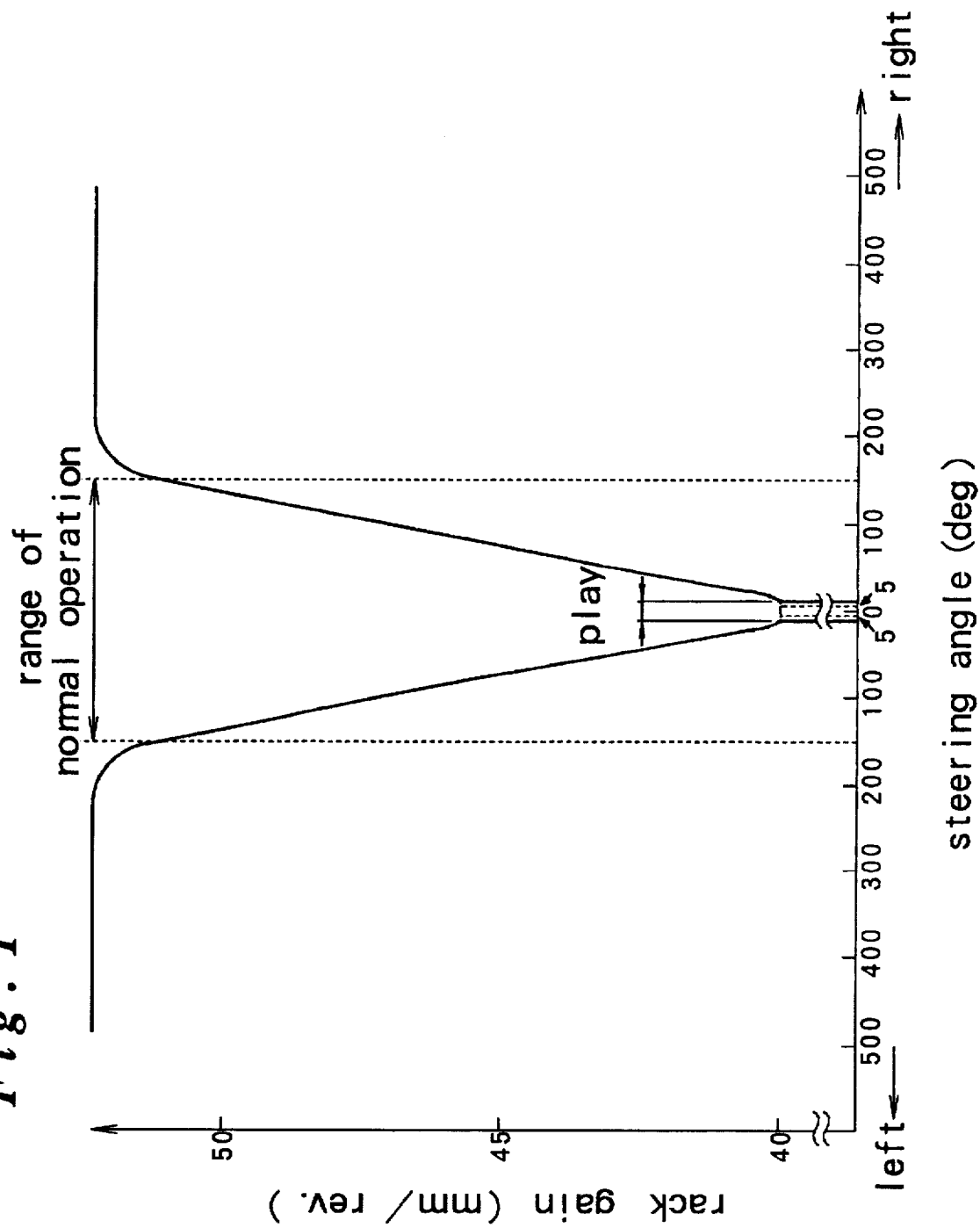
FIG. 1 is a graph showing the relationship between the rack gain and the magnitude of the steering input of the variable gear ratio steering device according to the present invention.
Figure 2:
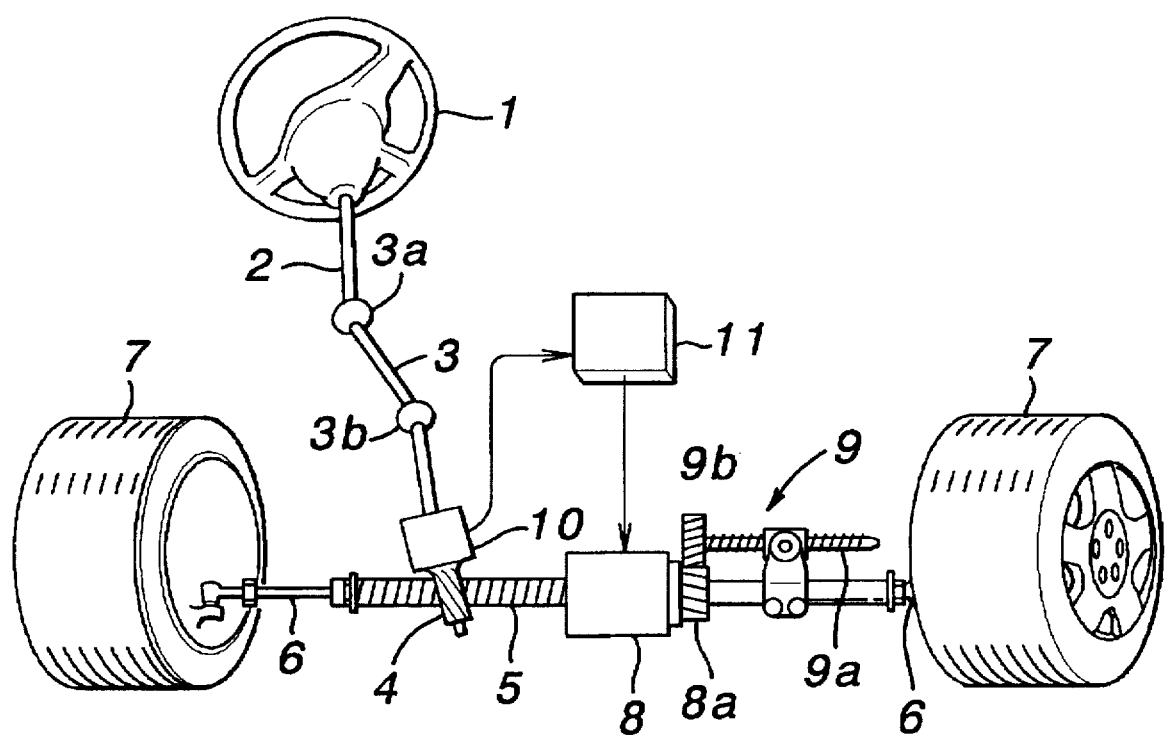
FIG. 2 is a schematic view of a typical steering system to which the present invention can be applied.
Figure 3:
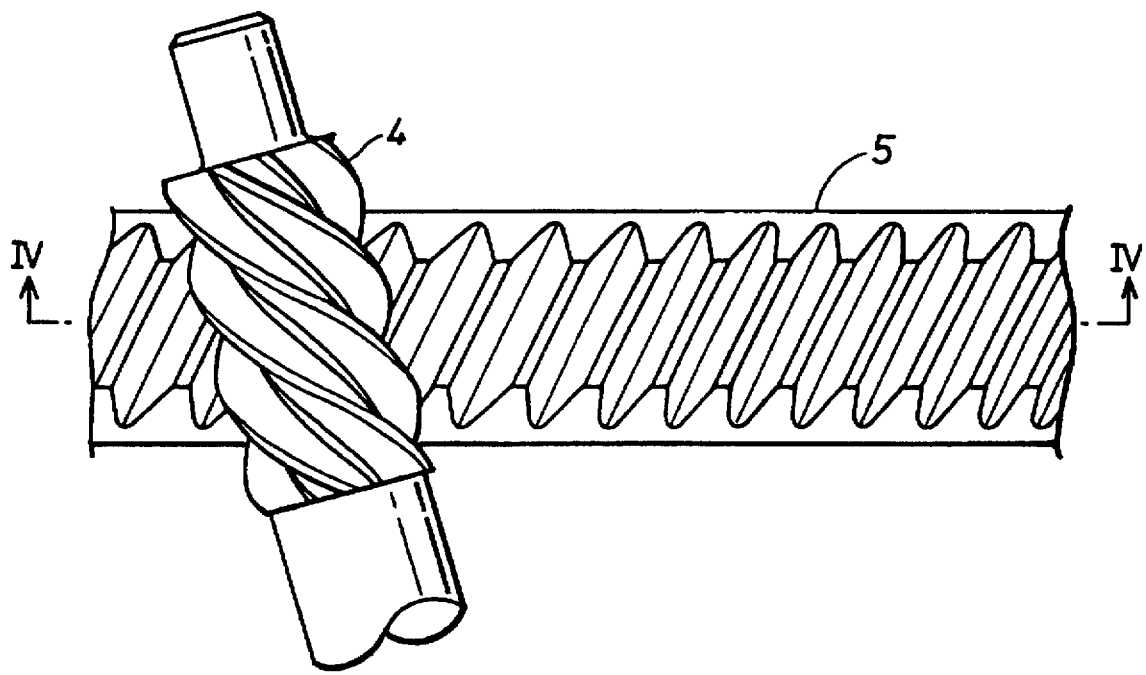
FIG. 3 is a variable gear ratio rack and pinion gear mechanism.
Figure 4:
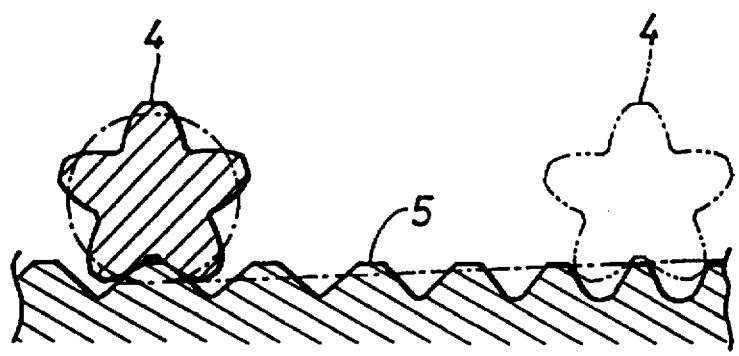
FIG. 4 is a sectional view taken along line IV—IV of FIG. 3.
Figure 5:
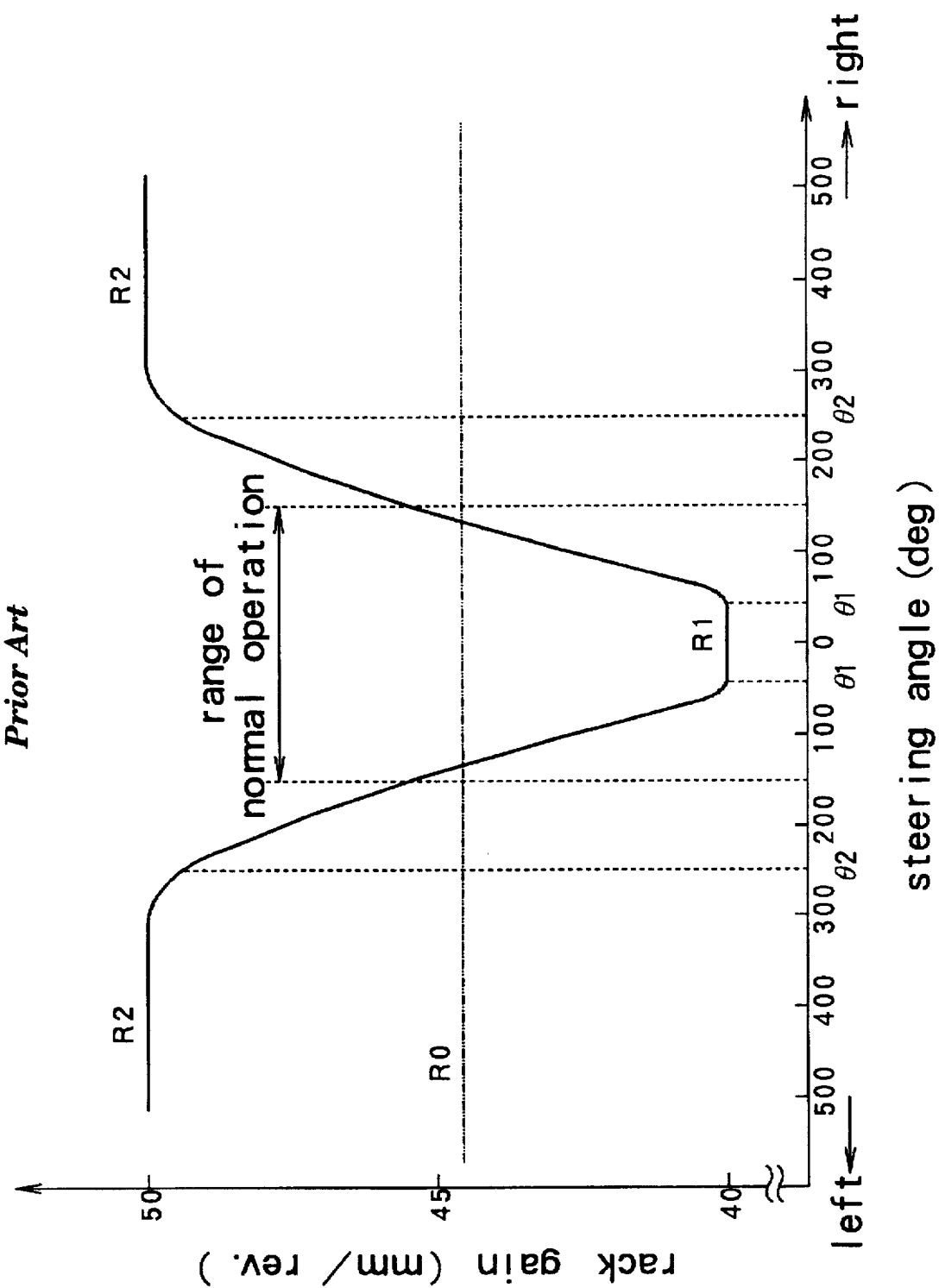
FIG. 5 is a graph similar to FIG. 1 showing the relationship between the rack gain and the magnitude of the steering input of the conventional variable gear ratio steering device.
Figure 6:
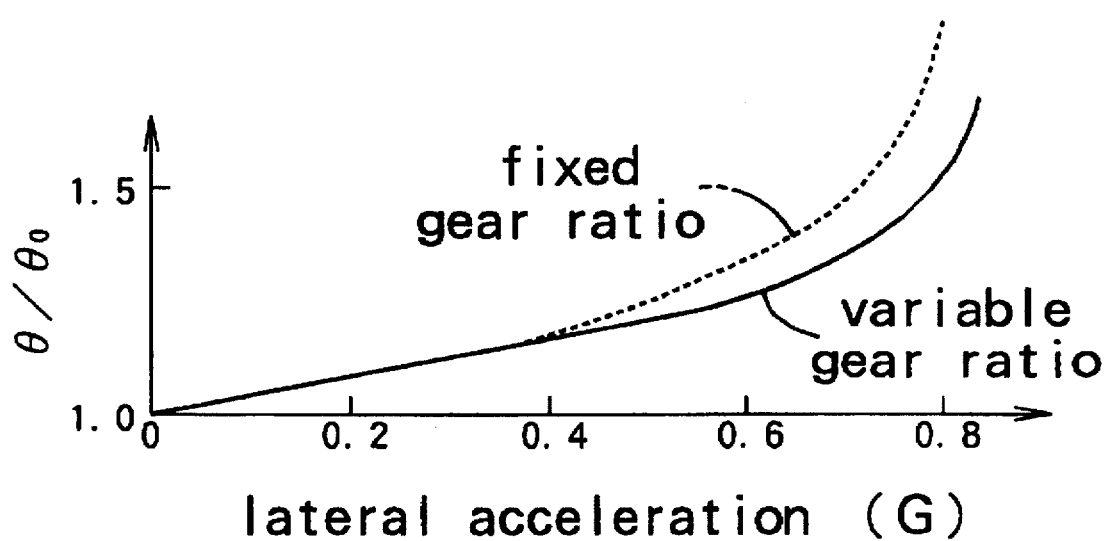
FIG. 6 is a graph showing the relationships between the magnitude of the steering angle adjustment and the lateral acceleration.

FIG. 1 is a graph, similar to FIG. 5, showing relationship between the rack gain and the steering input of an embodiment of the variable gear ratio steering device according to the present invention. The overall structure of this embodiment is similar to the one given in FIG. 2, and is therefore not described all over again.

The solid line curve shows the rack gain of the present embodiment in relation to the steering input, and includes a region of a fixed gear ratio extending approximately by 5 degrees on either side of the neutral position. This region is substantially covered by a play which may extend by 10 degrees on either side of the neutral position. This play is accounted for by the collective play of the various parts existing in the path of torque transmission, and includes a mechanical play of the steering mechanism, the elastic deformation of the support members, the twisting deformation of the tires, and the twisting of the torsion bar used in the electric power steering device for detecting the magnitude of the steering torque input.

According to the present invention, the region of a fixed low rack gain is contained within the collective play of the steering system. Therefore, when the steering wheel is turned beyond the range of the play existing around the neutral position, the range of a fixed low rack gain has already been exceeded, and the range of the a progressively increasing rack gain has already set in. Therefore, the vehicle operator can turn the steering wheel without encountering any sudden change in the vehicle response or the steering reaction because, in effect, there is no point of inflection in the property curve of the rack gain. Thus, the vehicle operator would not experience any unfamiliar impression, and can turn the vehicle around a corner in a medium to high speed range in a comfortable manner.

The range of a fixed low rack gain extends five degrees on either side of the neutral position because it is difficult to reduce this range any further various difficulties arising in the fabrication process. However, due to the inevitable presence of plays in the path of torque transmission, the rack can be conveniently fabricated so that the point of inflection may be located within the range of ±10 from the neutral position, making it possible to hide the point of inflection in the play, preventing the vihicle operator from experiencing any unfamiliar impression. Furthermore, in any power steering system, there is a certain amount of twisting angular displacement between the input shaft and the output shaft of the steering device which is typically accounted for by the twisting of a torsion bar incorporated in the steering device for detecting the steering torque input, and such a twisting angular displacement will safely cover the point of inflection therein. Some power steering devices use compression coil springs and other resiliently deformable member for creating a twisting deformation between the input shaft and the output shaft of the steering device, but the concept of the present invention can be equally applied to such power steering devices.

According to this embodiment, there is another point of inflection at a large steering angle, but this point is safely beyond the range of normal operation in a medium to high speed range, and the steering angle would not reach this level in a medium to high speed range. The steering angle will pass this level when the vehicle speed is low, but the response of the vehicle is not so important in the low speed range, and the vehicle operator will not be able to detect the presence of the point of inflection.

Thus, according to the present invention, because the point of inflection or the point of transition from a fixed low rack gain region to a region of a progressively increasing rack gain falls inside the region of the play of the steering mechanism in a variable gear ratio steering device, the vehicle operator would not be affected by the presence of the point of inflection because as soon as the steering wheel is turned beyond the play or the dead zone near the neutral position of the steering wheel the point of inflection has already been passed. Another point of inflection or the point of transition between the region of the progressively increasing rack gain and the fixed high rack gain region also would not affect the vehicle operator because it is located well outside the range of normal operation in a medium to high speed range, and it will not be noticeable in a low speed range even when the steering angle passes this point.

The width of the fixed low rack gain region may be selected as desired, and, for instance, may be made less than the maximum twisting angle of the torsion rod or an equivalent thereof incorporated in the power steering device.

Although the present invention has been described in terms of a specific embodiment, it is possible to modify and alter details thereof without departing from the spirit of the present invention.

What I claim is:

1. In combination, a variable gear ratio steering device, and an overall steering system of a vehicle including a steering wheel and a steering input, the variable gear ratio steering device comprising:

a pinion functionally coupled to the steering wheel; and a rack meshing with the pinion, wherein the rack has a tooth pitch distribution for producing a variable rack gain property in relation to the steering input which includes, in each rotational sense, a low fixed rack gain region near a neutral position, a high fixed rack gain region in a large steering input region, and a progressively increasing rack gain region connected to the low fixed rack gain region via a first point of inflection and to the high fixed rack gain region via a second point of inflection, and further wherein the first point of inflection is located within a first angle at the neutral position of an amount within a play in the overall steering system of the vehicle.

2. A combination according to claim 1, wherein the first angle is less than ten degrees.

3. A combination according to claim 1, wherein the second point of inflection is located outside a range of normal operation in a medium to high speed range.

4. A combination according to claim 1, wherein the vehicle consists of a front wheel drive vehicle.

* * * * *